United States Patent [19]

Paesler

[11] 4,247,937
[45] Jan. 27, 1981

[54] SYNTHESIS ARRANGEMENTS FOR USE IN DIGITAL DATA TRANSMISSION SYSTEMS

[75] Inventor: Martin R. A. Paesler, Burnham, England

[73] Assignee: Plessey Handel und Investments AG, Zug, Switzerland

[21] Appl. No.: 961,969

[22] Filed: Nov. 20, 1978

[30] Foreign Application Priority Data

Nov. 24, 1977 [GB] United Kingdom ............... 48884/77

[51] Int. Cl.$^3$ ............................ H04J 3/07; H04J 3/14
[52] U.S. Cl. ..................................... 370/102; 370/13; 371/31
[58] Field of Search ......... 179/15 AF, 15 BS, 15 BF; 370/102, 13, 110; 371/31, 32, 33; 375/34, 58

[56] References Cited

U.S. PATENT DOCUMENTS

| | | | |
|---|---|---|---|
| 3,575,557 | 4/1971 | McCowen | 179/15 AF |
| 3,668,645 | 6/1972 | Reymond et al. | 179/15 AF |
| 3,946,161 | 3/1976 | Husted et al. | 179/15 AF |
| 3,985,963 | 10/1976 | Boutmy et al. | 179/15 AF |
| 4,059,731 | 11/1977 | Green et al. | 370/110 |
| 4,132,862 | 1/1979 | Ferret et al. | 179/15 AF |

*Primary Examiner*—Douglas W. Olms
*Attorney, Agent, or Firm*—Fleit & Jacobson

[57] ABSTRACT

In highspeed digital communication systems a number of tributary data streams may be multiplexed into a single main data stream having a higher aggregate data rate. This main data stream contains frame alignment information to achieve correct demultiplexing. In addition pulse justification (pulse stuffing) time slots are provided, catering for the differences in phase and frequency between the individual tributary data and the main data stream, to control the remote oscillators in the demultiplexers. In the event of a data stream failure it is necessary to transmit an alarm indication signal over the failed data stream however the pulse justification equipment attempts to force the bit rate to zero. To overcome this, in the prior art, the data stream is replaced by one generated from a standby oscillator. Significant frequency deviations between the actual data stream when replaced and the injected data stream can be experienced causing substantial controlled oscillator realignment delays to be experienced even for short breaks. The proposal overcomes these problems by providing a shift register storage arrangement which is driven in parallel by the justification signals applied to the tributary data stream under normal operating conditions but does not have any output path. When the data stream fails the contents of the shift register are used to simulate the justification signals. Recirculation of the simulated justification signals also takes place while the data stream failure persists. The size of the simulated sequence (i.e. size of the shift register) determines the accuracy of the controlled oscillator and therefore the realignment delay.

4 Claims, 2 Drawing Figures

PRACTICAL CIRCUIT

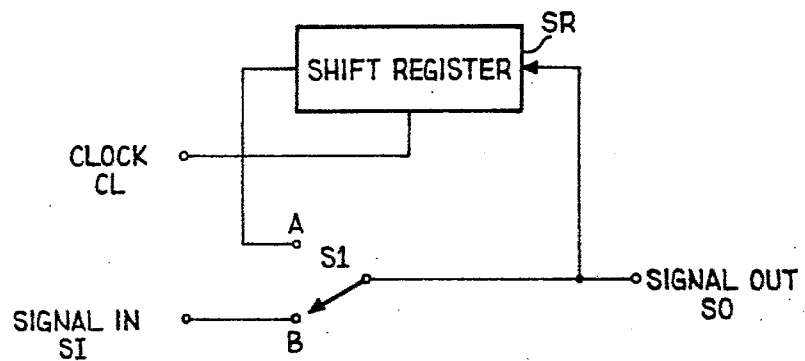
Fig. 1  BASIC IMPLEMENTATION
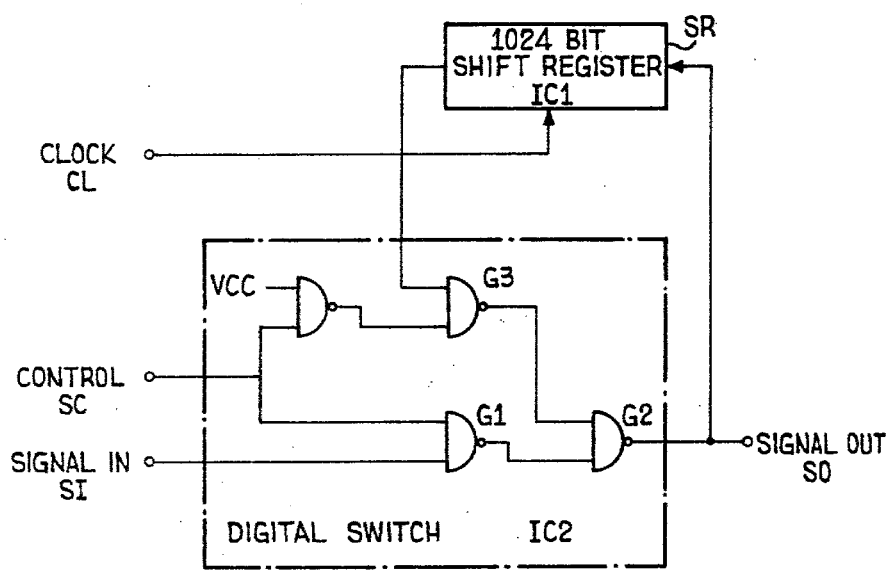
Fig. 2  PRACTICAL CIRCUIT

SYNTHESIS ARRANGEMENTS FOR USE IN DIGITAL DATA TRANSMISSION SYSTEMS

The present invention relates to data transmission systems handling time division multiplexed data streams and is more particularly concerned with the adaptive synthesis of justification control signals under failure conditions.

For highspeed digital communication systems a number of plesiochronous, tributary data streams may be time division multiplexed into a single higher rate aggregate data stream. This aggregate data stream contains frame alignment information to achieve correct demultiplexing, and in addition time slots are available to cater for the differences in phase and frequency between the individual tributary data and the aggregate data streams.

In order to accommodate the difference between the rate the incoming tributary data and the rate of the data stream in the aggregate signal of digital multiplexers, it is necessary to make adjustments on a continuous basis so that at the outgoing tributary data stream at the demultiplexer has exactly the same rate as the corresponding incoming tributary data stream. Failure to do this would lead to loss or gain of data bits and in digital transmission systems to loss of frame alignment every time a data bit is lost or gained. Integrity of the transmitted data is achieved by a method commonly known as pulse justification. Pulse justication may be positive or positive/negative, but for the purpose of describing the method the more common positive justification method is chosen. The justification process operates as follows, at the multiplexer the incoming tributary data is read cyclically into a store at the incoming data rate. Each data bit is held in a store for typically 8 bit periods after which it is replenished with a new data bit. The data is read out from the store at a rate slightly higher than the maximum possible write rate, and controlled by the multiplexer internal clock. The phases of the two clocks are compared such that a justification control digit is generated when the phase of the read clock has advanced beyond a predetermined amount. At the same time the read clock is stopped for one allocated time slot in the frame structure of the multiplexed data stream. The justification control digit is transmitted as part of the frame structure of the multiplexed signal.

At the demultiplexer the tributary data stream is written into a store, similar to that used in the multiplexer, under the control of a clock signal derived from the aggregate signal. When the control digit is received the write clock is inhibited at the time slot allocated for the interruption of the read clock in the multiplexer. As a result the same number of digits are read into both, the multiplexer and demultiplexer, stores. At the demultiplexer, however, the clock operates at a higher rate but contains gaps resulting from the extraction of the frame alignment signal, justification control signal and the interruption as a result of a justification signal. This gapped clock is compared with the continuous read clock derived from a controlled oscillator and the difference signal used to control the oscillator frequency. As a result the read clock controlling the output of the demultiplexer store has a mean frequency which exactly equals the mean bit rate of the incoming tributary data stream.

A difficulty arises in the event of the failure of an incoming tributary data stream. In such circumstances it is desirable to signal this condition to other equipment via the distant demultiplexer by means of an Alarm Indication Signal (AIS). Since in the failure mode the incoming bit rate is zero the associated justifications signal attempts to force the bit rate at the demultiplexer also to zero. If this were possible then the transmission of an AIS would be precluded. In practical systems the controlled oscillator in the demultiplexer would be forced to a condition of minimum frequency of oscillation well outside the specified frequency tolerance. In order to retain control over the justification signals and hence over the frequency of the controlled oscillator in the demultiplexer two methods are currently employed. One method consists of automatically replacing the missing data stream by an ordinary clock signal derived from a standby oscillator, the other method uses a synthesised justification signal which is inserted in a fixed proportion of the frames. Since in both cases the acutal frequency is replaced by a nominal frequency significant frequency deviations of the controlled oscillator are possible with currently specified frequency tolerances, leading to significant realignment delays even for relatively short breaks in the incoming data stream. The synthesis of the justification signal in a fixed ratio of the frames also leads to fairly complex hardware implementation because of the difficult ratios which have to be generated. If simple ratios are chosen the frequency tolerances can not be met.

It is an object of the invention to provide a simple means of generating a synthesised justification control signal which is adaptive to the relative rates of the tributary and aggregate data streams thereby providing a minimised change in frequency of the controlled oscillator when the incoming tributary data streams is interrupted or has failed.

According to the invention there is provided justification control signals synthesiser for use in a digital data transmission system employing justification control arrangements, the synthesiser comprising storage means driven in parallel by the justification control signals of a tributary data stream and upon interruption of the tributary data stream the synthesiser includes means for substituting the interrupted justification control signals with those signals stored in the storage means on a repetitive basis until the interruption of the tributary data stream ends.

In the preferred embodiment of the invention the storage means comprises a shift register storage arrangement which is driven in parallel by the justification signals applied to the tributary data stream under normal operating conditions but the shift register output path is blocked. When the data stream is interrupted the contents of the shift register are used to replace the interrupted justification signals. Recirculation of the simulated justification signals also takes place while the tributary data stream interruption persists. The size of the simulated sequence, (i.e. the size of the shift register) determines the accuracy of the controlled oscillator and therefore the realignment delay.

The invention will be more readily understood from the following description of the preferred embodiment which should be read in conjuntion with the accompanying drawings.

Of the drawing FIG. 1 shows the basic implementation of the invention whereas

FIG. 2 shows a practical implementation of the invention.

The basic implementation of the invention is shown in FIG. 1. Under normal operating condition of the multiplexer the switch S1 is in position 'B'. The justification control signal which is applied to the SIGNAL IN port SI passes straight through to the SIGNAL OUT port SO. At the same time the digits comprising the justification control signal are applied to the shift register SR and continuously shifted towards its output under the control of the clock signal CL which is derived from the multiplexer frame clock. Thus at any time the preceding sequence of justification control digits is stored in the shift register SR and also continuously updated and therefore adapted to the prevailing justification requirements. When the tributary data signal is interrupted the switch is changed to position 'A'. The previously stored sequence in shift register SR now replaces the original justification control signal at the SIGNAL OUT port SO. But since the input and output ports of the shift register SR are connected the sequence is recirculated and therefore repeated until the tributary data signal is restored and the switch is returned to position 'B'.

A practical implementation of the invention is shown in FIG. 2. It consists of two integrated circuits IC1 and IC2, IC1 is a 1024 bit shift register SR such as the Intel 2405 and IC2 is a quad 2 input NAND gate package. (It will be appreciated that the digital switch (IC2) may be realised in several different ways and this is not intended to be limiting to the invention). The CONTROL port SC is at a logic HIGH for normal operation allowing the justification control signal to pass from the SIGNAL IN port SI to the SIGNAL OUT port SO by way of gates G1 and G2. When the tributary data stream is interrupted the CONTROL Port SC is automatically changed to logic LOW isolating the SIGNAL IN port SI by closing gate G1 and opening G3. This causes the substituting and recirculating of the sequence stored in the shift register SR. Accordingly the justification signals are replaced by a sequence of 1024 justification control signals on a repetitive basis. The replacement signals being the same as the last 1024 justification signals sent before the interruption.

The invention relies on the fact that for practical purposes and over the duration of interruptions in the tributary data streams the mean tributary and aggregate bit rates can be considered constant. The justification ratio is therefore constant and the sequence of justification control digits is repetitive although it may be very long. Thus if a long enough sequence of digits is observed while the tributary data signal is present then repeating this sequence during the absence of tributary data will maintain the frequency of the controlled oscillator to an accuracy determined by the length of the sequence.

As explained above the available data rate in the aggregate signal is slightly higher than the maximum incoming tributary rate. Therefore, a justification control signal occurs in some but not all frames of the multiplexed signal. The proportion of frames containing a justification control signal is called the justification ratio j which can be expressed in terms of the relevant bit rates and frame structure parameters by the following equation $$j = \frac{nf_M - Nf_T}{f_M}$$ Equation 1 where
$f_M$ = bit rate of multiplexed signal
$f_T$ = bit rate of incoming tributary signal
n = number of available data time slots per tributary stream in aggregate signal
N = total number of time slots in frame of multiplexed signal In practice n and N are partly chosen to give a justification ratio between $\frac{1}{3}$ and $\frac{1}{2}$. The ratios for nominal bit rates of the various multiplexers are given in Table 1.

TABLE 1

| Multiplexer | | j nominal |
|---|---|---|
| 2-8 | Mbit | 14/33 |
| 8-34 | Mbit | 78/179 |
| 34/68-140 | Mbit | 57/136 |
| 8-120 | Mbit | 272/625 |

If a sequence of q frames is monitored then r frames will contain a justification signal and the justification ratio is given by $$j = \frac{r}{q}$$ Equation 2

Since r must be a whole number the maximum error made while synthesising the justification ratio is $j \cdot q - r = \pm 1$. Rearranging equation 1 to obtain the tributary bit rate for a given justification ratio gives $$f_T = \frac{f_M}{N}(n - j)$$ Equation 3

Substituting for j $$f_T = \frac{f_M}{N}(n - \frac{r}{q})$$ Equation 4 since the maximum error in r is ±1 the relative bit rate error in ft becomes $$\frac{\Delta f_T}{f_T} = \frac{f_M}{Nf_T}(n - j \pm \frac{1}{q}) - 1$$ Equation 5

But substituting for j—(Eqn 1)

$$\frac{\Delta f_T}{f_T} = \frac{f_M}{qNf_T}$$ Equation 6

Thus the error in the synthesised justification signal is inversely proportioned to the length of sequence of justification digits stored. Table 2 gives the frequency tolerances obtained for a sequence of 1024 bits and the maximum range of justification signals in 1024 frames taking into account maximum difference of tributary and aggregate rates.

TABLE 2

| Multiplexer | $\frac{\Delta f_T}{f_T}$ | Justification range |
|---|---|---|
| 2-8 | 4.75 × 10$^{-6}$ | 417-452 digits |
| 8-34 | 2.6 × 10$^{-6}$ | 426-466 digits |
| 34-140 | 1.35 × 10$^{-6}$ | 403-455 digits |
| 8-120 | 3.2 × 10$^{-6}$ | 431-459 digits |

Justification Range and bit rate tolerance of different multiplexers for a repeated sequence of 1024 bits.

What we claim is:

1. A justification control signal synthesiser for use in a digital data transmission system employing justification control arrangements, the synthesiser comprising storage means arranged to receive and store the justification control signals of a tributary data stream passing over a data path and upon interruption of the tributary data stream the synthesiser includes means for injecting into the interrupted data stream justification control signals by injecting those signals stored in the storage means on a repetition basis into the data path until the interruption of the tributary data stream ends.

2. A justification control signal synthesiser according to claim 1 in which the storage means comprises a shift register storage arrangement driven in parallel by the justification signals of the tributary data stream with the shift register output path disconnected from the data path.

3. A justification control signal synthesiser according to claim 2 in which the shift register storage arrangement includes means for connecting the shift register output path to the tributary data stream to replace the interrupted justification signals with those stored in the shift register.

4. A justification control signal synthesiser according to claim 3 in which the tributary data stream is connected to the input of a digital switch and the input of the shift register is connected to the output of the digital switch and the digital switch is arranged to pass the tributary data stream from its input to its output and to disconnect the output of the shift register and upon interruption of the tributary data stream the digital switch is arranged to connect the output of the shift register to the output of the digital switch.

* * * * *